Patented Mar. 20, 1945

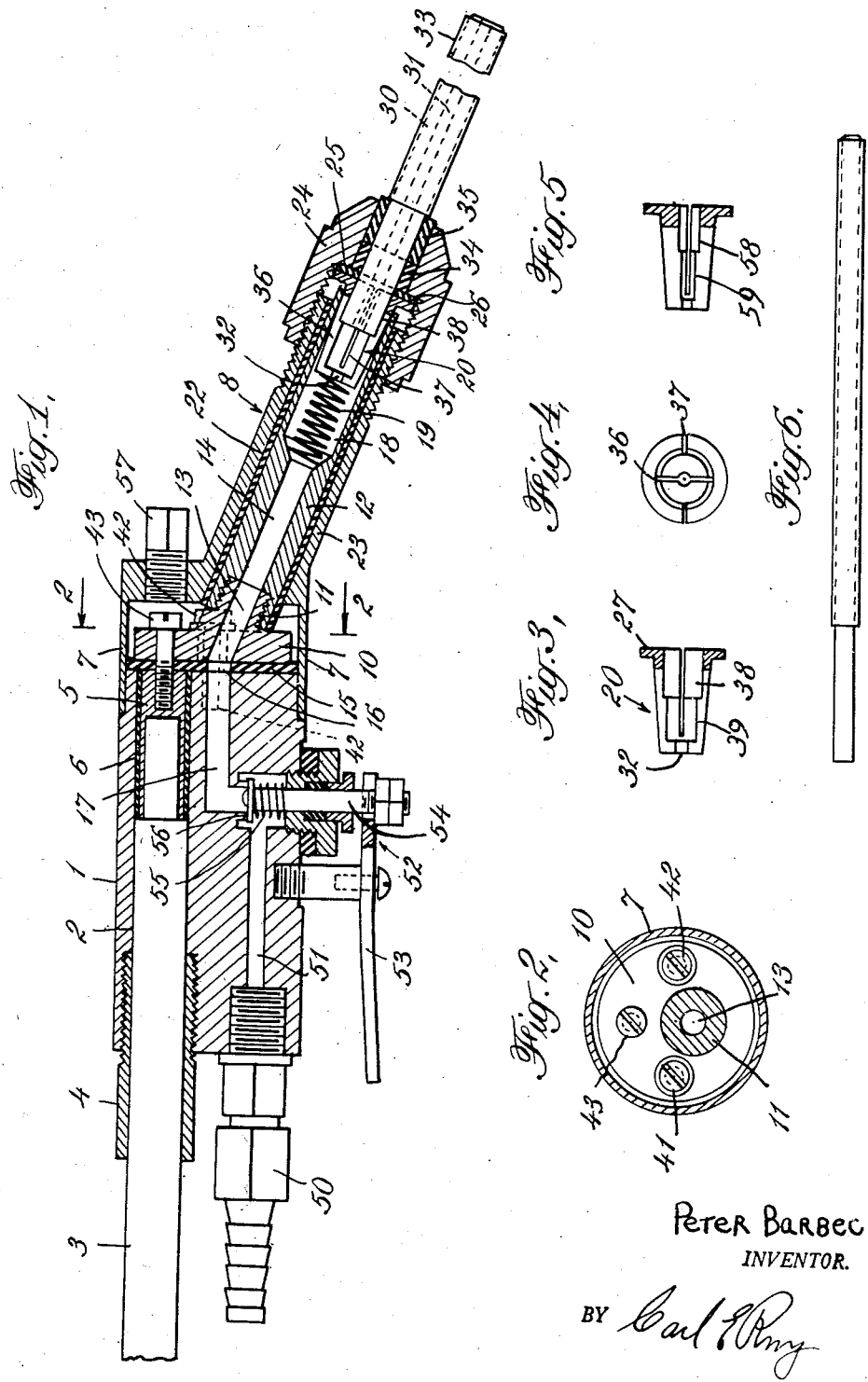

2,371,945

UNITED STATES PATENT OFFICE 2,371,945

ELECTRODE HOLDER

Peter Barbeck, New York, N. Y., assignor to Oxygen Arc Equipment Co., Inc., New York, N. Y., a corporation of New York Application August 5, 1943, Serial No. 497,475

6 Claims. (Cl. 219—15)

This invention relates to electrode holders for arc welding and cutting, especially under water, and has for its object the provision of an improved manually operated electrode holder of the type provided with means to supply gas, such as oxygen, through a hollow electrode to the vicinity of the arc and provided with means for preventing the escape of gas. The invention more particularly provides an electrode holder formed largely of metal in which the insulation is so positioned and arranged in the holder that the current flows internally from its source to the electrode thereby preventing the metallic exterior of the holder from causing short circuits.

In accordance with an advantageous embodiment of the invention, the holder comprises means for connecting to sources of gas and electricity and tubular means in the holder which is electrically insulated from the exterior of the holder for supplying gas and electricity to a hollow electrode. The holder includes gripping means for securing the electrode in position in positive electrical contact with the tubular means, and gas sealing means, preferably an elastic rubber member, in gripping engagement with the exterior of the electrode whereby the electrode, when pushed into operative position, establishes electrical contact and at the same time the opening in the electrode is brought into communicating engagement with the gas in the tube. I may use in the electrode engaging portion of the holder a split metal chuck which grips the electrode with spring action, and means such as a spring for maintaining positive contact between the tube supplying both gas and electricity and the chuck. A hollow electrode in the chuck is in positive electrical contact with the tube, and is gripped externally by the elastic rubber member forcing the gas to pass from the tube through the center of the electrode without loss. The holder may be used for arc welding in which gas is not used by inserting a solid electrode in a chuck of such form as to accommodate solid electrodes.

The electrode holder of the invention is especially suitable for arc cutting in which the hollow electrode is supplied with oxygen to oxidize the metal heated by the arc, and the internal insulation prevents the metallic exteriors from short circuiting.

The invention will be better understood after considering the following description taken in conjunction with the accompanying drawing, in which Fig. 1 is a longitudinal sectional view of an electrode holder embodying the invention;

Fig. 2 is a view along line 2—2 of Fig. 1;

Figs. 3 and 4 are sectional and end views respectively of a split chuck such as used in the holder of Fig. 1;

Fig. 5 is a split chuck for the solid electrode of Fig. 6, and

Fig. 6 is a solid welding electrode of usual construction.

The electrode holder illustrated in the drawing comprises a body portion 1 of metal having a longitudinal hole 2 for the insertion therein of the rubber covered electrical cable 3. A tubular extension 4 is screwed into the body 1 at one end to aid in supporting the cable. The insulation is removed from the end of the cable and a contact head 5 is soldered to the metal conductor. The outside diameter of the head is sufficiently smaller than the hole 2 to accommodate the tubular insulation 6. The right end of the body 1 has a small diameter neck over which is fitted the collar 7 attached to the electrode engaging member 8. The collar is preferably securely engaged to the neck with a shrunk connection made possible by heating the collar to expand it and then letting it cool while in the position shown.

The disc 10 is of smaller diameter than the inside of the collar 7 and has a depending hollow nipple 11 on one side which is threaded to the tube 12. The disc 10 and nipple 11 have a hole 13 coinciding with the hole 14 in the tube and the disc of insulation 15 between the disc 10 and the body 1 has a hole 16 over the duct 17. The right end of the tube 12 has a large diameter opening 18 for receiving the coiled spring 19 and the conical portion of the split chuck 20. The tube 12 is insulated throughout its length by the annular layer of insulation 22 from the tubular holder frame 23 which is integral with the collar 7. The nut 24 threaded to the frame 23 has a shoulder 25 which presses the disc of insulation 26 against the flange 27 of the chuck. By turning the nut 24 clockwise the chuck is pressed to the left collapsing the coil spring 19 pressing the chuck into positive electrical contact with the tube 12. The electrode 30 has a central opening 31 in direct communication through the hole 32 in the chuck with the holes 13, 14 and 18. The exposed exterior part of the electrode has a layer of insulation 33 and the left end is bare metal for insertion through the tightly engaging elastic rubber rings 34 and 35 and the split chuck 20. The slits 36 and 37 permit the chuck to expand and grip the electrode when it is pressed into the central bore 39 which is normally slightly smaller in diameter than the bare metal end of the electrode. Bores 38 and 39 and 68 and 69 of different diameters are provided in order to accommodate welding and burning rods of different diameters. The electrode is thus gripped by the chuck and in positive electrical connection with the tube 12.

In assembling the electrode engaging members, the insulating disc 16 is placed in the position shown and the disc 10 is placed thereon. The screws 41 and 42 are then inserted to secure the disc 10 in position. The bolt 43 is then screwed into the contact head 5 and the disc 10 is now in electrical connection with the cable. The collar 7 is then forced into position with the collar engaging the neck of the body 1. The tubular insulation 22 and the tube 12 are then inserted and the tube is screwed onto the nipple 11 bringing the tube into electrical connection with the cable. The spring 19 is inserted in the hole 18 and the chuck pressed into the position described by the nut 24.

The gas-hose nipple 50 is screwed into the holder and supplies gas from a source under pressure to the duct 51. The manually operated gas valve 52 has a lever 53 for raising the plunger 54 against the action of spring 55 from the seat 56 permitting gas to flow into duct 17 which is in direct contact with holes 13, 14, 18 and the hole 31 in the electrode. By manipulating the lever 53, the desired amount of gas, usually oxygen, is forced through the hollow electrode.

The cable 3 may be removed from the assembled holder by removing the plug 57 and unscrewing bolt 43.

The holder of Fig. 1 is especially advantageous for gas-arc cutting when using a hollow electrode. It may also be used for welding with solid rods such as shown in Fig. 6. When the electrode of Fig. 6 is used, a chuck such as shown in Fig. 5 which has a hole 58 to receive the bare end of the solid electrode is inserted in the opening 18 of the tube.

The various insulating layers 6, 16, 22 and 26 may be of any suitable material such as impregnated pressed paper, vulcanized rubber, or the like; and the elastic rubber rings 34 and 35 not only serve as electrical insulation but as seals preventing the escape of oxygen around the outside of the electrode. With the exception of the electrical insulation and rubber rings the holder is preferably constructed entirely of metal, such as brass.

It will be apparent that the exterior of the electrode holder of the invention which is entirely of metal, is not connected with the electric circuit. While an old electrode may be removed merely by pulling it out and a new one inserted merely by pushing it into the position shown, the electrode is, nevertheless, easily placed in positive electrical connection and the gas cannot escape around the exterior of the electrode.

I claim:

1. A holder for hollow electrodes which comprises a metal body portion, an electrode engaging member of metal attached to the body portion, means for supplying gas and electricity to the interior of the body portion and the electrode engaging member, means for removably attaching a hollow electrode to the said member, means for maintaining an electrical connection between the means for supplying electricity and the electrode, electrical insulation interposed between the means for maintaining the electrical connection, the body portion and the electrode engaging member, and an elastic rubber member in operative engagement with the electrode engaging member which grips the exterior of the electrode and prevents an escape of gas.

2. An electrode holder for hollow electrodes which comprises means inside the holder electrically insulated from the exterior of the holder for passing electricity from a source of electricity to the electrode, means for passing gas from an outside source through the holder to the opening in the electrode, and elastic rubber means in the holder for gripping the exterior of the electrode where it is inserted into the holder to prevent an escape of gas.

3. An electrode holder for hollow electrodes which comprises a metal body portion, an electrode engaging member of metal removably attached to the body portion, a tubular member in the electrode engaging member electrically insulated therefrom, means electrically insulated from the body portion for passing electricity from an outside source to the tubular member, means for passing gas from an outside source to the tubular member, a metal chuck in engagement with the tubular member for gripping an electrode inserted therein, and elastic means carried by the electrode engaging member and having a hole therein for the insertion of the electrode to prevent the escape of gas and electrical contact between the exterior of the electrode and the electrode engaging member.

4. An electrode holder for an underwater welding and cutting torch, comprising a body portion and an electrode engaging member of metallic material, means in said body portion for introducing gas and an electric current, means to insulate said electric current introducing means from said body portion, tubular means in said engaging member for transmitting electric current and gas from said body portion, said tubular means being insulated from said body portion and said engaging member, an electrode holding member carried by said tubular means, means, forming part of said engaging member, for seating said electrode holding member in electrode engaging position, and a resilient member operatively engaged between said tubular means and electrode holding member for assisting in ejecting said electrode holding member on removal of said seating means.

5. An electrode holder for an underwater welding and cutting torch, comprising a body portion and an electrode engaging member of metallic material, means in said body portion for introducing gas and an electric current, means to insulate said electric current introducing means from said body portion, tubular means in said engaging member for transmitting electric current and gas from said body portion, said tubular means being insulated from said body portion and said engaging member, an electrode holding member carried by said tubular means, and means, including an insulating member, forming part of said engaging member, for seating said electrode holding member in electrode engaging position, said insulating member also being formed to engage an electrode carried by said electrode holding member and prevent the passage of gas alongside of said electrode.

6. In an electrode holder for an underwater welding and cutting torch, comprising a body portion and electrode engaging member of metallic material, means for introducing gas and an electric current into said body portion, means to insulate said electric current introducing means from said body portion, mounting means carried by said body portion but insulated therefrom to transmit gas and an electric current from said body portion into said electrode engaging member, a tubular gas and electric current conducting member inside of said electrode engaging member and insulated therefrom, and interengaging means on said mounting means and said tubular member for detachably mounting said tubular member thereon, whereby said tubular member may be removed and replaced if desired.

PETER BARBECK.